K. ALQUIST.
GEARING FOR DOUBLE ROTATION TURBINES.
APPLICATION FILED JAN. 16, 1918.
1,351,319. Patented Aug. 31, 1920.
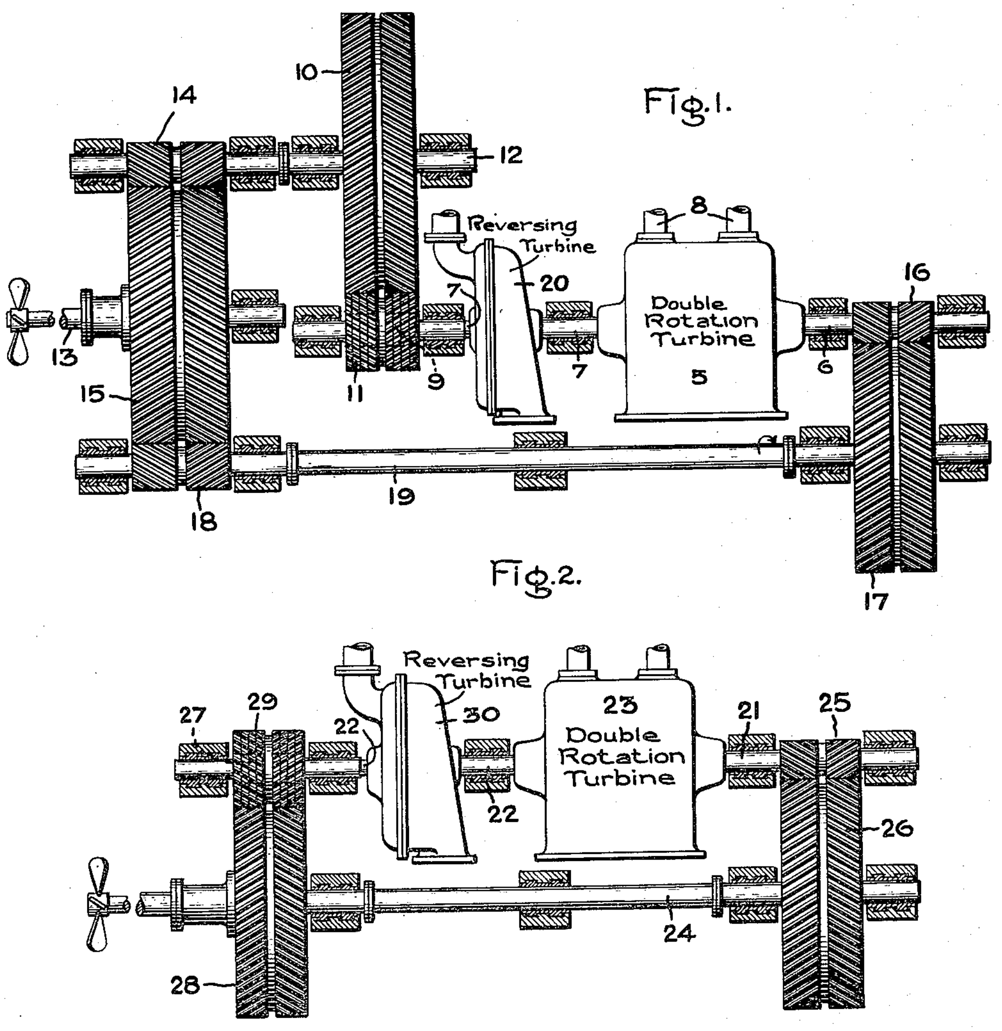
Fig.1. Fig.2.
Fig.3.
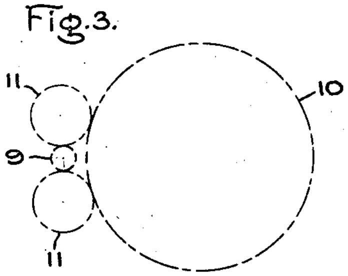
Fig.4.
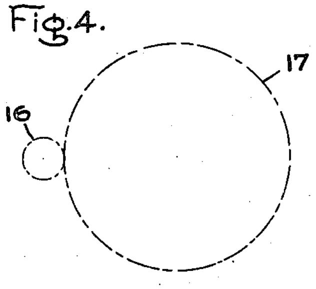
Inventor:
Karl Alquist,
by [signature]
His Attorney.

UNITED STATES PATENT OFFICE.

KARL ALQUIST, OF SCHENECTADY, NEW YORK.

GEARING FOR DOUBLE-ROTATION TURBINES.

1,351,319. Specification of Letters Patent. Patented Aug. 31, 1920.

Application filed January 16, 1918. Serial No. 212,028.

*To all whom it may concern:*

Be it known that I, KARL ALQUIST, a subject of the King of Sweden, residing at Schenectady, in the county of Schenectady, State of New York, have invented certain new and useful Improvements in Gearing for Double-Rotation Turbines.

In connection with the use of double rotation turbines; *i. e.*, turbines having two rotors which revolve in opposite directions, it is often desirable to apply power derived from both rotors through reduction gearing to a single shaft, and to do this the difficulty arises that the rotation of one of the rotor shafts must be converted into rotation in the opposite direction. It has already been proposed to accomplish this by means of gearing, the power being transmitted from one rotor shaft through a gearing which includes an idler and from the other through a similar gearing which does not include an idler, thus bringing about a reversal in the direction of rotation of one of the rotor shafts relative to the other.

The object of my present invention is to provide an improved gearing arrangement for use in connection with double rotation turbines by means of which the opposite rotation of the two shafts of the rotors may be efficiently and advantageously converted into rotation in the same direction so that both rotors may be utilized to drive a common shaft.

For a consideration of what I believe to be novel and my invention, attention is directed to the accompanying specification and the claims appended thereto.

In the drawing, Figure 1 illustrates a gearing arrangement embodying my invention; Fig. 2 shows a modified arrangement, and Figs. 3 and 4 illustrate diagrammatically gearing features common to both Figs. 1 and 2.

Referring to Fig. 1, 5 indicates a double rotation turbine having a rotor shaft 6 which revolves in one direction, and a rotor shaft 7 which revolves in the opposite direction. Elastic fluid is admitted to the turbine by conduits 8. The showing of this turbine is only diagrammatic and it will be understood that it may be of any suitable type.

Now, according to my invention, I transmit power from one rotor shaft to a driven shaft which may be a counter-shaft or the main driven shaft through a gearing of a type invented by me which comprises a pinion which drives a low speed wheel through two flexible gear wheels which transmit the load in parallel, each flexible gear wheel comprising a plurality of disks or plates fixed at their central portions on a common support and slightly spaced apart at their peripheries so as to permit of slight axial adjustment under tooth pressure. Such a gearing is disclosed in my Patent No. 1,165,830, dated December 28, 1915. As will be clear, the use of such a gearing in connection with one rotor not only gives me all the advantages of it as set forth in such patent, but serves as well to give such a direction of rotation to the shaft which it drives, as enables it to be connected to the shaft of the other rotor. A gearing of this type is illustrated diagrammatically in Fig. 3, where 9 is a pinion which drives the low speed wheel 10 through two intermediate flexible gear wheels 11. The gear wheels 11 transmit the load in parallel and are preferably of the type invented by me, as referred to above.

In the arrangement shown in Fig. 1, a gearing as shown in Fig. 3 is used to transmit power from the shaft 7 to the counter-shaft 12 and the respective members of the gearing in Fig. 1 have been designated by the numerals used in Fig. 3. This gives the shaft 12 the same direction of rotation as that of shaft 7. The two shafts 12 and 6 can then be coupled together in any suitable manner. In Fig. 1 they are shown as being geared to a driven shaft 13, here indicated as a propeller shaft, through suitable gearing which comprises a low speed pinion 14 on shaft 12 which meshes with gear wheel 15 on shaft 13, and a pinion 16 on shaft 6 which drives gear wheel 15 through high speed gear wheel 17 and low speed pinion 18 which are carried on shaft 19. As will be clear, this amounts to a double reduction gearing between the shafts 6 and 7 and the driven shaft 13. It will also be clear that the counter-shafts 12 and 19 rotate in the same direction. In this arrangement the shafts 12 and 19 are arranged on opposite sides of the turbine 5. Where the arrangement is intended for ship propulsion, which is one use to which it is well adapted, a reversing turbine may be provided, as indicated at 20. Fig. 4 shows diagrammatically an end view of pinion 16 and gear wheel 17.

In Fig. 2 a modified arrangement is shown in which the shafts 21 and 22 of a double rotation turbine 23 drive the shaft 24, here indicated as being a propeller shaft. The shaft 21 drives it through a gearing, as shown in Fig. 4, comprising pinion 25 and gear wheel 26, and the shaft 22 drives it through a gearing as shown in Fig. 3 comprising a pinion 27 which drives a gear wheel 28 on shaft 24 through two intermediate wheels 29. In this case the gearing is a single reduction one. 30 indicates a reversing turbine which may be provided in case the arrangement is used for ship propulsion.

It will be understood that the two arrangements shown are only illustrative of arrangements which may embody my invention and that various other arrangements may be used if desired.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

In combination, a turbine having two rotors which revolve in opposite directions, shafts for said rotors, a driven shaft, gearing through which said driven shaft is driven by both rotors, the gearing for one rotor shaft comprising a gear wheel and a pinion meshing directly therewith, and the gearing for the other rotor shaft comprising a pinion, a gear wheel, and two intermediate gear wheels through which power is transmitted in parallel from the pinion to said gear wheel, and a reversing turbine associated with one of the rotor shafts.

In witness whereof, I have hereunto set my hand this 14th day of January, 1918.

KARL ALQUIST.